US007217212B2

(12) United States Patent
Fanselow et al.

(10) Patent No.: US 7,217,212 B2
(45) Date of Patent: May 15, 2007

(54) DIFFERENTIAL GEAR SYSTEM HAVING A STABLY-ORIENTED ORBITING GEAR

(75) Inventors: Eckhard Fanselow, Blumenhagen (DE); Erich R. Mueller, Heilbronn (DE)

(73) Assignee: Orbiter Gears Marketing & Finance AG, Brunnen (CH)

(*) Notice: Subject to any disclaimer, the term of this patent is extended or adjusted under 35 U.S.C. 154(b) by 174 days.

(21) Appl. No.: 10/982,269

(22) Filed: Nov. 5, 2004

(65) Prior Publication Data

US 2006/0089227 A1    Apr. 27, 2006

Related U.S. Application Data

(60) Provisional application No. 60/622,723, filed on Oct. 27, 2004.

(51) Int. Cl.
  *F16H 1/32*    (2006.01)
(52) U.S. Cl. .................. 475/174; 475/248; 475/249
(58) Field of Classification Search ............ 475/248, 475/174
  See application file for complete search history.

(56) References Cited

U.S. PATENT DOCUMENTS

| | | | | |
|---|---|---|---|---|
| 4,407,544 A | | 10/1983 | Baehring | 297/362 |
| 4,674,361 A | | 6/1987 | Parsons | 74/804 |
| 4,841,809 A | * | 6/1989 | Jolly | 475/163 |
| 5,324,240 A | | 6/1994 | Guettinger | 475/162 |
| 6,582,338 B1 | | 6/2003 | Fleytman | 475/227 |
| 6,634,979 B1 | | 10/2003 | Quaife | 475/249 |

FOREIGN PATENT DOCUMENTS

| | | |
|---|---|---|
| DE | 4312869 C2 | 12/1994 |
| DE | 4429315 A1 | 2/1995 |
| DE | 19515146 A1 | 4/1996 |
| DE | 19515146 C2 | 4/1996 |
| DE | 19601103 A1 | 7/1996 |
| DE | 19654125 A1 | 5/1997 |
| DE | 19709020 A1 | 11/1997 |
| DE | 19709020 C2 | 11/1997 |
| DE | 19918533 A1 | 10/1999 |
| DE | 10127676 A1 | 12/2002 |

(Continued)

*Primary Examiner*—Charles A. Marmor
*Assistant Examiner*—Edwin A. Young
(74) *Attorney, Agent, or Firm*—Imperium Patent Works; Darien K. Wallace; T. Lester Wallace (57) ABSTRACT

A differential gear system employs stably-oriented orbiting gears to convey drive torque from a drive shaft differentially to a first wheel shaft and to a second wheel shaft. A portion of the drive torque is conveyed to the first wheel shaft, and the remainder of the drive torque is conveyed to the second wheel shaft. The differential gear system uses a first stably-oriented orbiting inner gear to convey torque to the first wheel shaft and a second stably-oriented orbiting inner gear to convey torque to a second wheel shaft. Dual-axis couplings allow the stably-oriented orbiting inner gears to move in a translational, orbital motion, but prevent the inner gears from rotating. Each of the stably-oriented orbiting inner gears has outer teeth, whose surfaces are substantially planar. The outer teeth of the stably-oriented orbiting inner gears mesh with flat-surfaced inner teeth of hollow gears.

5 Claims, 8 Drawing Sheets

FOREIGN PATENT DOCUMENTS

| | | |
|---|---|---|
| DE | 10261588 A1 | 7/2004 |
| GB | 2301418 | 12/1996 |
| GB | 2301418 A * | 12/1996 |
| WO | WO 00/39483 | 7/2000 |
| WO | WO 02/44586 | 6/2002 |

* cited by examiner

DIFFERENTIAL GEAR SYSTEM HAVING A STABLY-ORIENTED ORBITING GEAR

CROSS REFERENCE TO RELATED APPLICATION

This application claims the benefit under 35 U.S.C. §119 of provisional application Ser. No. 60/622,723, entitled "Differential Gear System With A Stably-Oriented Orbiting Gear Having Flat-Surfaced Teeth", filed Oct. 27, 2004. The subject matter of provisional application Ser. No. 60/622,623 is incorporated herein by reference.

TECHNICAL FIELD

The present invention relates generally to differential gear systems and, more specifically, to a differential gear system that employs engaging surfaces between the teeth of orbiting gears and rotating hollow gears.

BACKGROUND

Differential gear systems for vehicles are well known in the art. A differential gear system allows a vehicle to travel in a curve without dragging one wheel of a pair of powered wheels. When a vehicle travels in a curve, the inner and outer wheels of the vehicle rotate at different speeds because the wheels on the outside of the curve must travel a greater distance than the wheels on the inside of the curve. Where either the front or rear wheels are not powered but rather spin freely, the outer wheel simply turns faster than the inner wheel. A differential rotating speed, however, is not possible if both wheels of a pair of powered wheels are attached to a single, continuous axle. For that reason, the drive shaft of a vehicle typically does not transfer power from the vehicle's engine directly to a continuous axle that transfers power to a pair of wheels. Instead, the drive shaft is coupled to a differential gear mechanism that drives separate wheel shafts (also called "half shafts" or "universal shafts"). Each wheel shaft is coupled to and drives a wheel. The differential gear system allows each wheel of a pair of powered wheels to rotate at a different speed.

Figure 1:
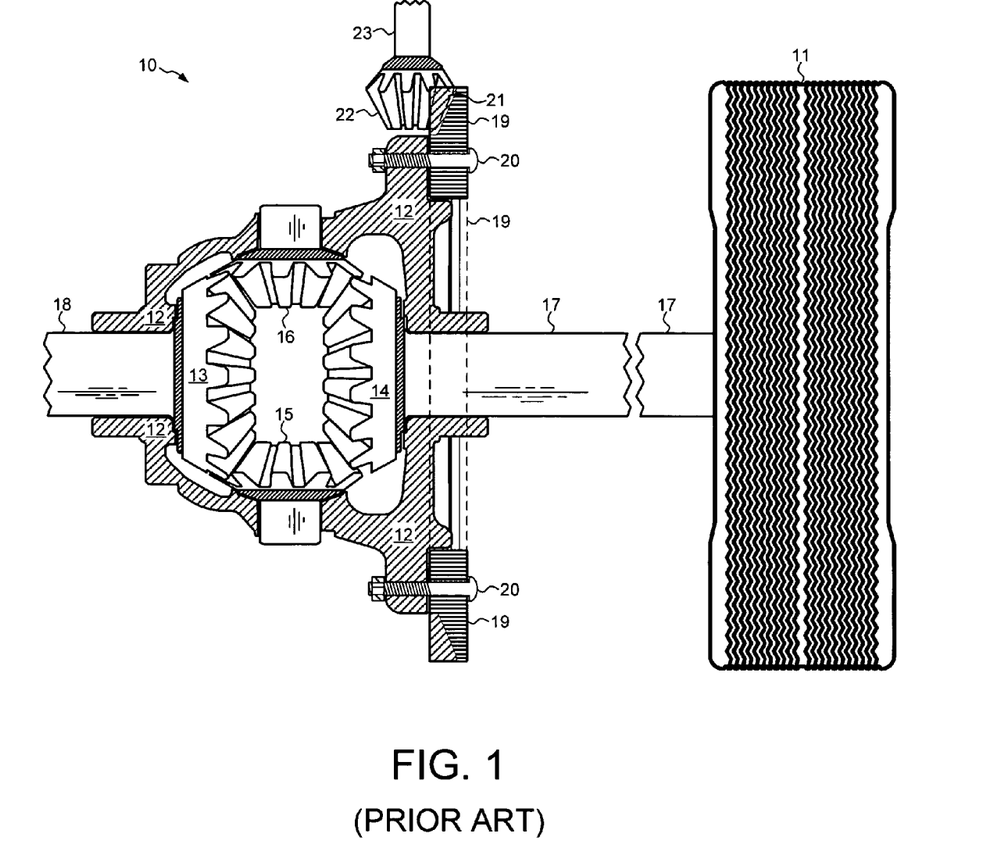
FIG. 1 (prior art) is a top-down view of a conventional differential gear system.

FIG. 1 (prior art) shows a conventional differential gear system 10 from a top perspective in a rear-wheel-drive vehicle. The forward driving direction of the vehicle is oriented towards the top of FIG. 1 such that a right rear wheel 11 is shown to the right. Differential gear system 10 includes a differential casing 12 in which two bevel gears 13–14 and two beveled pinions 15–16 are rotatably mounted. The teeth of each bevel gear mesh with the teeth of the two pinions 15–16. In addition, the teeth of each pinion mesh with the teeth of the two bevel gears 13–14. Thus, bevel gears 13–14 and pinions 15–16 rotate in unison. Bevel gear 14 is attached to a right rear wheel shaft 17, which in turn is attached to right rear wheel 11. Bevel gear 13 is attached to a rear left wheel shaft 18. A larger bevel gear wheel, called a crown wheel 19, is attached to the outside of differential casing 12, for example, by bolts 20 that pass through both differential casing 12 and crown wheel 19. Differential casing 12 is mounted on the vehicle such that the entire casing can rotate about the axis of right and left wheel shafts 17–18. For example, differential casing 12 may be enclosed within a housing (not shown) that does not rotate.

Crown wheel 19 has beveled teeth 21 that mesh with teeth of a bevel pinion 22 attached to the end of the vehicle's drive shaft 23. Power from the vehicle's engine is transferred through a gearbox or transmission system to drive shaft 23 and then to differential gear system 10. A rotation of bevel pinion 22 on drive shaft 23 causes crown wheel 19 and the entire differential casing 12 to rotate. When differential casing 12 rotates, pinions 15–16 are carried by differential casing 12 and revolve about the axis of wheel shafts 17–18. When the vehicle is traveling straight ahead, there is no relative motion between bevel gears 13–14 and pinions 15–16. Because wheel shafts 17–18 are attached to bevel gears 13–14, wheel shafts 17–18 rotate at the same rotational speed as differential casing 12, and right wheel shaft 17 rotates at the same speed as left wheel shaft 18.

When the vehicle is traveling in a left curve, for example, differential gear system 10 allows right wheel shaft 17 to rotate faster than left wheel shaft 18 such that right rear wheel 11 on the outside of the curve can travel a greater distance than the left rear wheel on the inside of the curve. Because bevel gears 13–14 and pinions 15–16 rotate in unison, bevel gear 13 rotates in an equal and opposite direction from bevel gear 14. Thus, right rear wheel 11 rotates faster than differential casing 12 by the same difference in rotational speed as the left rear wheel rotates slower than differential casing 12.

Various modifications to the conventional differential gear system have been proposed. Efforts have been made to reduce the size and weight of the differential gear system and its components. Reducing the weight improves the overall fuel efficiency of the vehicle carrying the differential gear. Reducing the size of the differential gear system allows the space savings to be used for other purposes, such as to expand the gas tank or trunk of the vehicle.

One modification has been to construct a differential gear using worm gears as described in U.S. Pat. No. 6,582,338. The torque capacity associated with worm gears, however, can be limited. Another modification employs multiple planetary pinions with helical teeth surrounding sun gears. U.S. Pat. No. 6,634,979 describes a differential gear system in which a sun gear is attached to each wheel shaft. Each sun gear has outer helical teeth that mesh with helical teeth on six planetary pinions.

These modifications do not necessarily reduce the size and weight of the differential gear system. In addition, these modifications do not necessarily reduce the number of components within the differential gear system. Reducing the size and number of components can decrease the cost of manufacturing the differential gear system. Moreover, as the number and complexity of the components decreases, the durability of the system tends to increase and maintenance costs are reduced.

Modifying the conventional differential gear system containing beveled gears by employing worm gears or gears with helical teeth does not necessarily achieve the desired advantages of reduced size, weight and cost and can even result in decreased torque capacity. A differential gear system is sought that does not employ beveled gears, worm gears or gears with helical teeth.

SUMMARY OF THE DISCLOSURE

A differential gear system employs stably-oriented orbiting gears to convey drive torque from a drive shaft of a vehicle differentially to a first wheel shaft and to a second wheel shaft. A portion of the drive torque is conveyed to the first wheel shaft, and the remainder of the drive torque is conveyed to the second wheel shaft. In one embodiment, when the vehicle travels in a curve with traction on both wheels, the entire drive torque is conveyed to the outer wheel shaft.

The differential gear system uses a first stably-oriented orbiting inner gear to convey torque to the first wheel shaft and a second stably-oriented orbiting inner gear to convey torque to a second wheel shaft. Dual-axis couplings allow the stably-oriented orbiting inner gears to move in a translational, orbital motion, but prevent the inner gears from rotating. Each of the stably-oriented orbiting inner gears has outer teeth, whose surfaces are substantially planar in one embodiment. The outer teeth of the stably-oriented orbiting inner gears mesh with substantially planar inner teeth of hollow gears in which the stably-oriented orbiting inner gears orbit. In another embodiment, outer teeth with convex surfaces meshingly engage inner teeth of hollow gears having concave surfaces.

In another embodiment, a differential gear system includes a casing, a hollow gear with inner teeth rotatably mounted in the casing to rotate about a central axis, and a stably-oriented orbiting inner gear with outer teeth that meshingly engage the inner teeth of the hollow gear. The casing is rotatably mounted to rotate about the central axis. The stably-oriented orbiting inner gear is supported by a dual-axis coupling that enables the inner gear to orbit about the central axis. The dual-axis coupling is attached to a wheel shaft that is rotatably mounted in the casing to rotate about the central axis.

A method is disclosed for receiving a drive torque onto a gear of a differential gear that includes a first stably-oriented orbiting gear and a second stably-oriented orbiting gear. A portion of the drive torque is transferred to a first wheel shaft using the first stably-oriented orbiting gear. The remainder of the drive torque is transferred to a second wheel shaft using the second stably-oriented orbiting gear.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2A:
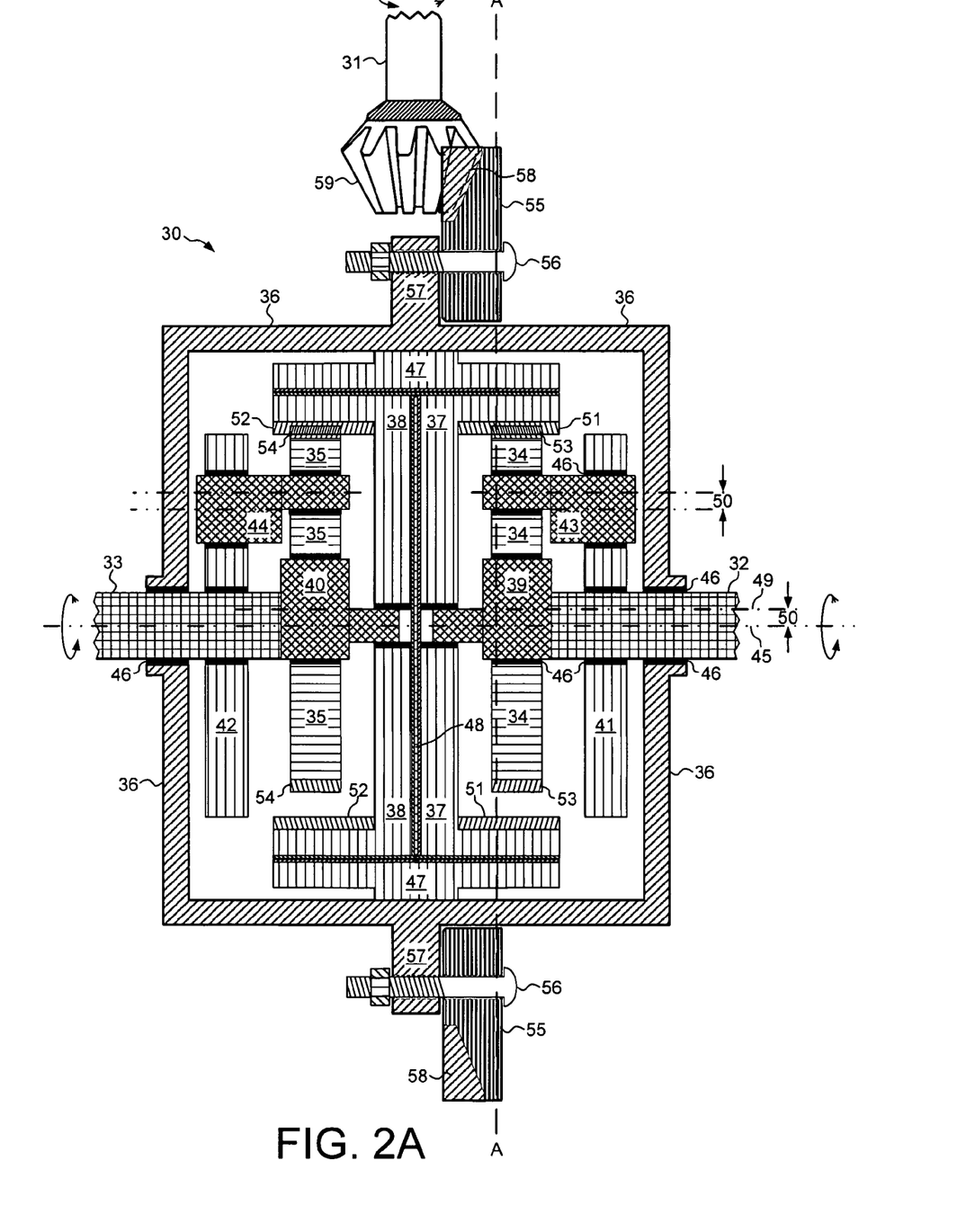
FIG. 2A is a top-down view of a differential gear system that employs stably-oriented orbiting gears to convey drive torque from a drive shaft differentially to a first wheel shaft and to a second wheel shaft.

FIG. 2A shows a differential gear system 30 that employs stably-oriented orbiting gears to convey drive torque from a drive shaft 31 differentially to a first wheel shaft 32 and to a second wheel shaft 33. A portion of the drive torque is conveyed to first wheel shaft 32, and the remainder of the drive torque is conveyed to second wheel shaft 33. Differential gear system 30 uses a first stably-oriented orbiting inner gear 34 to convey torque to first wheel shaft 32 and a second stably-oriented orbiting inner gear 35 to convey torque to second wheel shaft 33. Differential gear system 30 is shown from a top perspective in a rear-wheel-drive vehicle, and first wheel shaft 32 is connected to the right rear wheel (not shown) of the vehicle.

Differential gear system 30 includes first wheel shaft 32, second wheel shaft 33, first stably-oriented orbiting inner gear 34, second stably-oriented orbiting inner gear 35, a differential casing 36, a first hollow gear 37, a second hollow gear 38, a first dual-axis coupling 39 and a second dual-axis coupling 40. In addition, differential gear system 30 includes four passive dual-axis couplings and two support members 41–42 for those passive dual-axis couplings. A first passive dual-axis coupling 43 and a second passive dual-axis coupling 44 are visible from the perspective shown in FIG. 2A. First passive dual-axis coupling 43 is rotatably mounted in support member 41.

Each of first wheel shaft 32 and second wheel shaft 33 rotate about a central axis 45. In this embodiment, the rear wheels of the vehicle also rotate about central axis 45. Differential casing 36, as well as support members 41–42, are also mounted to rotate about central axis 45. Bearings permit differential casing 36 and support members 41–42 to rotate around the wheel shafts about central axis 45.

Although needle bearings 46 are employed in this embodiment, other types of bearings may also be used.

First hollow gear 37 and a second hollow gear 38 are mounted within differential casing 36 such that their central axes are aligned with central axis 45. In this embodiment, first hollow gear 37 and second hollow gear 38 are impeded from rotating about central axis 45 relative to differential casing 36 by clutch ring 47. In addition, first hollow gear 37 and second hollow gear 38 are impeded from rotating with respect to each other by clutch pad 48.

First dual-axis coupling 39 is an eccentric crank with two parallel axes: central axis 45 and a first orbiting axis 49. Central axis 45 and first orbiting axis 49 are separated by an offset distance 50. Each of the four passive dual-axis couplings, including first passive dual-axis coupling 43, is also an eccentric crank with two parallel axes. The two parallel axes of the passive dual-axis couplings are also separated by offset distance 50. First stably-oriented orbiting inner gear 34 is supported by first dual-axis coupling 39 such that gear 34 remains centered on first orbiting axis 49 and orbits about central axis 45. First stably-oriented orbiting inner gear 34 maintains its Cartesian orientation as it orbits about central axis 45. The dual-axis couplings allow first stably-oriented orbiting inner gear 34 to move in a translational, orbital motion, but yet prevent gear 34 from rotating. The orientation of first stably-oriented orbiting inner gear 34 is maintained by the combined guidance of first dual-axis coupling 39, first passive dual-axis coupling 43, and an additional passive dual-axis coupling not visible in FIG. 2A.

First hollow gear 37 has inner teeth 51, and second hollow gear 38 has inner teeth 52. First stably-oriented orbiting inner gear 34 has outer teeth 53, and second stably-oriented orbiting inner gear 35 has outer teeth 54. All of inner teeth 51, inner teeth 52, outer teeth 53 and outer teeth 54 are cut parallel to central axis 45. As first stably-oriented orbiting inner gear 34 orbits about central axis 45, outer teeth 53 of first stably-oriented orbiting inner gear 34 mesh with inner teeth 51 of first hollow gear 37. In an analogous manner, outer teeth 54 of second stably-oriented orbiting inner gear 35 mesh with inner teeth 52 of second hollow gear 38. Inner teeth 51, inner teeth 52, outer teeth 53 and outer teeth 54 are all cut parallel to the axes of the respective gears. In an alternative embodiment, first hollow gear 37 and second hollow gear 38 are combined and attached to differential casing 36. In that case, the combined hollow gear has one set of inner teeth.

A crown wheel 55, a large bevel gear wheel, is attached to the outside of differential casing 36. For example, crown wheel 55 is attached to differential casing 36 by bolts 56 that pass through both crown wheel 55 and a flange 57 of differential casing 36. Differential casing 36 is mounted on the vehicle such that the entire casing can rotate about central axis 45. Differential casing 36 is typically enclosed within a housing (not shown) that does not rotate. Crown wheel 55 has beveled teeth 58 that mesh with teeth of a bevel pinion 59 attached to the end of drive shaft 31.

Figure 2B:
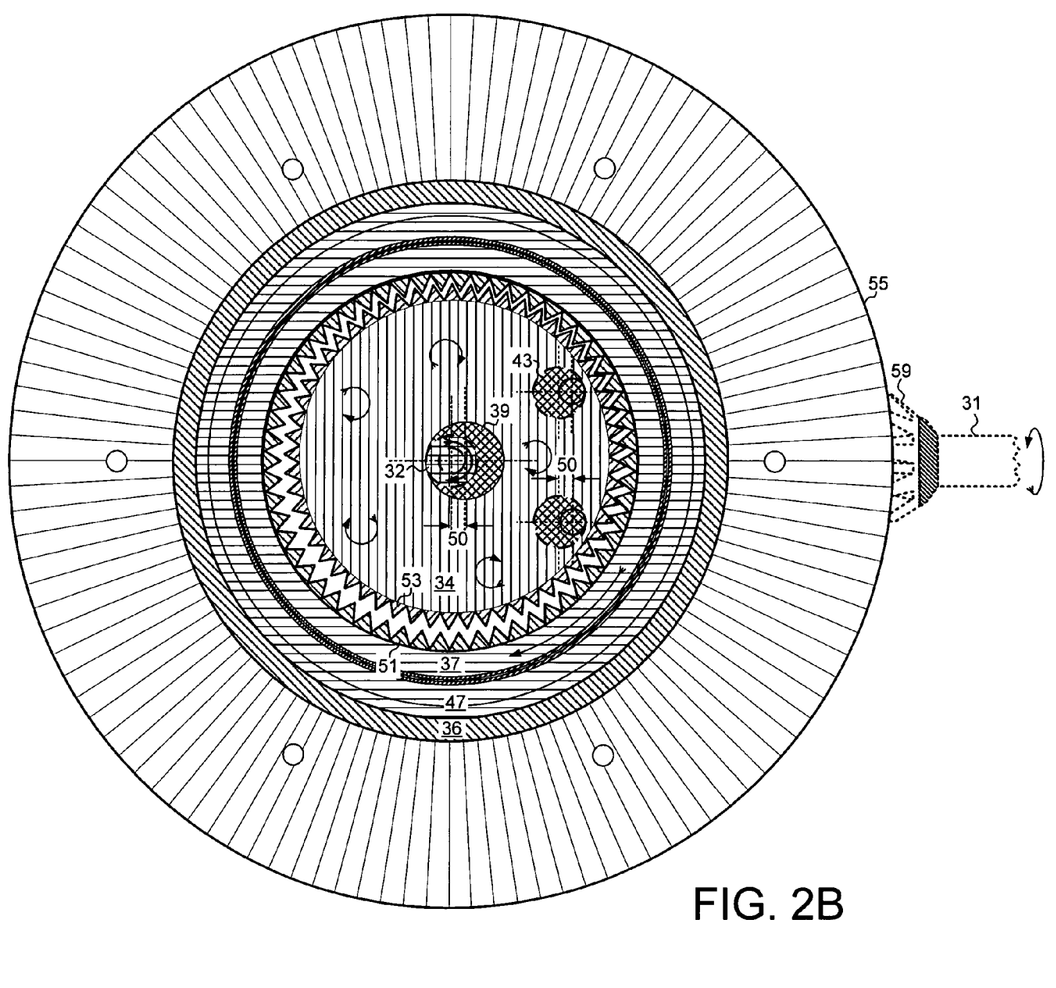
FIG. 2B is a cross-sectional view of the differential gear system of FIG. 2A.

FIG. 2B shows a cross-sectional view of differential gear system 30 through cross section A—A. FIG. 2B illustrates the operation of first stably-oriented orbiting inner gear 34 within first hollow gear 37. As first hollow gear 37 rotates in a clockwise direction, inner teeth 51 of first hollow gear 37 press on outer teeth 53 of first stably-oriented orbiting inner gear 34. First stably-oriented orbiting inner gear 34 does not begin to rotate about central axis 45 because it is held in a stable orientation by three dual-axis couplings: first dual-axis coupling 39, first passive dual-axis coupling 43 and an additional passive dual-axis coupling (not visible from the perspective of FIG. 2A). Instead, the force of inner teeth 51 on outer teeth 53 causes first stably-oriented orbiting inner gear 34 to orbit about central axis 45 as the meshing area of inner teeth 51 and outer teeth 53 moves clockwise around the periphery of first stably-oriented orbiting inner gear 34. Inner teeth 51 and outer teeth 53 remain in meshing engagement as first stably-oriented orbiting inner gear 34 orbits because the diameter of first hollow gear 37 at the mid-height of inner teeth 51 (also called the "pitch circle diameter") is greater than the diameter of first stably-oriented orbiting inner gear 34 at the mid-height of outer teeth 53 by twice offset distance 50. Thus, first stably-oriented orbiting inner gear 34 is orbiting with two degrees of freedom as opposed to rotating, as do gears with only one degree of freedom. As first stably-oriented orbiting inner gear 34 orbits about central axis 45, first dual-axis coupling 39 is caused to rotate about central axis 45.

First dual-axis coupling 39 rotates about central axis 45 in the same direction, but at a faster angular velocity, than does first hollow gear 37. The speed at which first dual-axis coupling 39 rotates relative to first hollow gear 37 is a function of the number (Ti) of inner teeth 51 and the number (To) of outer teeth 53. First dual-axis coupling 39 rotates i times faster than first hollow gear 37, where i equals Ti/(Ti—To). In FIG. 2B, there are fifty-eight inner teeth 51 and fifty-seven outer teeth 53. Thus, first dual-axis coupling 39 rotates fifty-eight times faster than first hollow gear 37.

In some embodiments, the gear ratio is as high as 250:1 between a dual-axis coupling (rotatably mounted in a stably-oriented orbiting inner gear) and a hollow gear. This gear ratio is considerably higher than the typical maximum gear ratio of about 12:1 for a conventional gear and pinion. For example, where a reduction ratio of 250:1 is desired, twenty conventional gear and pinion pairs would be required to perform that same reduction accomplished by one hollow gear and one stably-oriented orbiting inner gear. Consequently, the weight and size of an expansion gear system or reduction gear system can be greatly reduced by employing hollow gears and corresponding stably-oriented orbiting inner gears where a large expansion or reduction ratio is desired.

In the embodiment of FIG. 2B, both inner teeth 51 and outer teeth 53 have teeth surfaces that are substantially planar. The flat surfaces of the teeth of differential gear system 30 are in contrast to the profile of the teeth of the bevel gears and pinions of the conventional differential gear system 10 shown in FIG. 1 (prior art). All of the teeth of gears employed in conventional differential gear systems typically have convex surfaces, such as involute gears, cycloidial and hypocycloidial gears and circular-arc gears. Teeth with convex surfaces are used meshingly to engage two gears, each of which has only one degree of freedom. Because first stably-oriented orbiting inner gear 34 orbits with two degrees of freedom, the flat surfaces of outer teeth 53 on first stably-oriented orbiting inner gear 34 can come into parallel contact with the flat surfaces of inner teeth 51 of first hollow gear 37. More force can be transferred via the larger contact area of two substantially planar tooth surfaces than via a line of engagement (also called a "line of action") where two mating convex tooth profiles contact. Therefore, more torque can be transferred from first hollow gear 37 to first stably-oriented orbiting inner gear 34 via an engaging surface than via a line of engagement between a gear and a pinion having similar pitch circle diameters to hollow gear 37 and inner gear 34, respectively, where the gear and pinion have convex-surfaced teeth and are made of the same material. Consequently, an engaging surface between a hollow gear and a stably-oriented orbiting inner gear made of a weaker material can convey the same amount of torque as conveyed by a line of engagement between similarly sized conventional gears made of a stronger material. For example, an engaging surface between two plastic gears might be capable of conveying the same an amount of torque as transferred via a line of engagement between two similarly sized gears of a stronger material, such as metal.

Figures 3, 4:
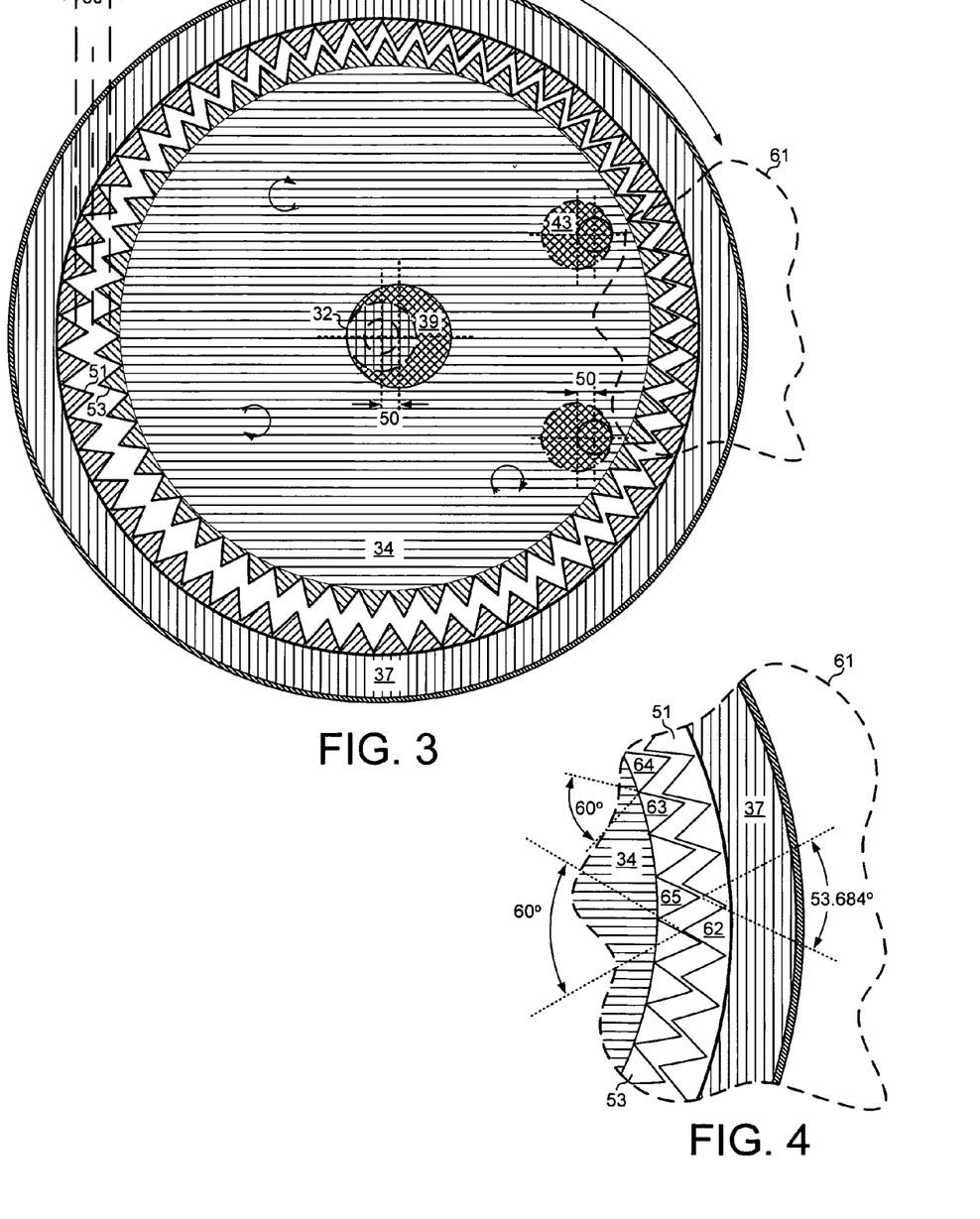
FIG. 3 is a more detailed view the stably-oriented orbiting inner gear and hollow gear of FIG. 2B.
FIG. 4 is a more detailed view of the meshing of the inner and outer teeth of FIG. 3.

FIG. 3 is a more detailed view of first stably-oriented orbiting inner gear 34 and first hollow gear 37 as shown in FIG. 2B. FIG. 3 illustrates how outer teeth 53 on first stably-oriented orbiting inner gear 34 are in meshing engagement with inner teeth 51 of first hollow gear 37. Inner teeth 51 and outer teeth 53 remain in meshing engagement as first stably-oriented orbiting inner gear 34 orbits because the difference 60 in pitch circle diameters of first hollow gear 37 and first stably-oriented orbiting inner gear 34 is twice the offset distance 50. The flat surfaces of the inner teeth of a hollow gear will not come into parallel contact with the flat surfaces of the outer teeth of stably-oriented orbiting inner gear, however, if the angles of the inner teeth and outer teeth are not suitable. Inner teeth 51 are in contact with outer teeth 53 in an area labeled 61.

FIG. 4 shows the meshing of inner teeth 51 with outer teeth 53 in area 61 in more detail. In the embodiment shown in FIG. 4, the tooth angles are suitable for parallel contact of the tooth surfaces when the angle of the teeth of first hollow gear 37 equals the angle of the valleys of first stably-oriented orbiting inner gear 34. In this embodiment, each tooth of inner teeth 51 has an angle of approximately sixty degrees. For example, the planar surfaces of tooth 62 form an angle of sixty degrees. In this embodiment, the valleys between the teeth of first stably-oriented orbiting inner gear 34 each has an angle of sixty degrees. For example, the planar surface of one tooth 63 makes an angle of sixty degrees with the surface of an adjacent tooth 64. Therefore, the angle of outer teeth 53 of first stably-oriented orbiting inner gear 34 does not equal the angle of inner teeth 51 of first hollow gear 37. The angle of an outer tooth 65, for example, equals 53.684 degrees, which is the angle of the valleys between outer teeth 53 minus the quotient 360° divided by the number of outer teeth 53. [(53.684°=60°−(360°/57)].

The translational motion of first stably-oriented orbiting inner gear 34 in two degrees of freedom allows the flat surfaces of outer teeth 53 to come into parallel contact with the flat surfaces of inner teeth 51 of first hollow gear 37 with substantially no lateral movement at the moment of contact. The contact of tooth surfaces without sliding greatly reduces friction and consequently the need for lubrication. For example, some embodiments of a differential gear system that employs stably-oriented orbiting gears can be operated without a lubricant, such as oil.

Figure 5:
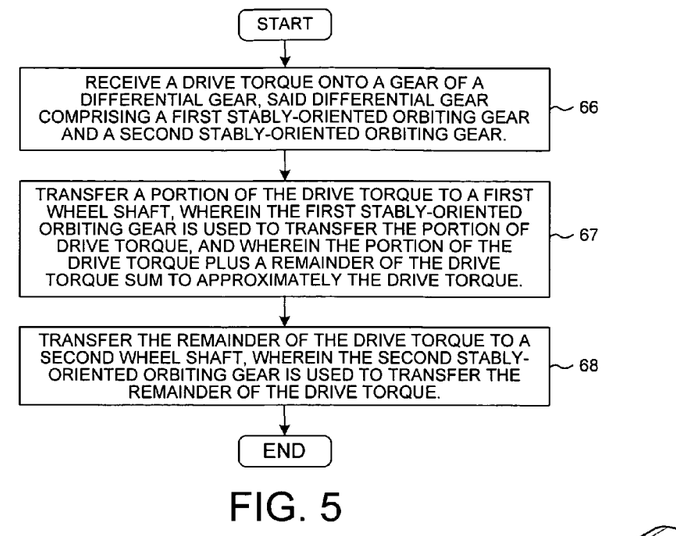
FIG. 5 is a flowchart of steps for conveying drive torque differentially to a first wheel shaft and a second wheel shaft.

FIG. 5 is a flowchart showing steps 66–68 by which drive torque is conveyed from drive shaft 31 through differential gear system 30 employing stably-oriented orbiting gears differentially to first wheel shaft 32 and to second wheel shaft 33. The operation of individual elements of differential gear system 30, as shown in FIGS. 2–5, is explained in detail in connection with the steps listed in FIG. 5.

In a first step 66, drive torque is received from drive shaft 31 onto crown wheel 55 of differential gear system 30. Within differential gear system 30, torque is transferred from a flat surface of one of inner teeth 51 of first hollow gear 37 to a flat surface of one of outer teeth 53 of first stably-oriented orbiting inner gear 34. Differential gear system 30 delivers the power from the vehicle's engine to each pair of wheels. In the embodiment of FIG. 2A, differential gear system 30 is illustrated with respect to only the rear pair of wheels. Differential gear system 30 divides the engine's power between the inner and outer wheels to suit the driving conditions. Drive shaft 31 transmits torque to differential casing 36, causing the entire differential casing 36 to rotate about central axis 45. When differential casing 36 rotates, first hollow gear 37 and second hollow gear 38 are carried through clutch ring 47 by differential casing 36 and revolve about central axis 45.

When the vehicle is traveling straight ahead, there is no relative motion between either first stably-oriented orbiting inner gear 34 and first hollow gear 37 or between second stably-oriented orbiting inner gear 35 and second hollow gear 38. With respect to first stably-oriented orbiting inner gear 34, for example, the binding forces associated with first dual-axis coupling 39, first passive dual-axis coupling 43 and an additional passive dual-axis coupling (not visible from the perspective of FIG. 2A) must first be overcome before first stably-oriented orbiting inner gear 34 begins to orbit. These binding forces are not overcome when the vehicle travels straight ahead because the orbiting of first stably-oriented orbiting inner gear 34 would result in first dual-axis coupling 39 rotating fifty-eight times faster than first hollow gear 37.

Even when first stably-oriented orbiting inner gear 34 does not orbit, however, power is nevertheless transferred through differential gear system 30 by a flat surface of one of inner teeth 51 of first hollow gear 37 pressing on a flat surface of one of outer teeth 53 of first stably-oriented orbiting inner gear 34. Therefore, more torque can be transferred from first hollow gear 37 to first stably-oriented orbiting inner gear 34 than between a gear and a pinion having similar pitch circle diameters, respectively, where the gear and pinion have convex-surfaced teeth and are made of the same material as are first hollow gear 37 and inner gear 34. Thus, differential gear system 30 can be made smaller and lighter than a conventional differential gear system that differentially conveys the same amount of torque from a drive shaft to two wheel shafts. The savings in space can be used to expand the gas tank or trunk of the vehicle, for example. And the reduced weight improves the overall fuel efficiency of a vehicle that uses differential gear system 30 instead of a conventional differential gear.

Because first stably-oriented orbiting inner gear 34 is not orbiting with respect to first hollow gear 37, there is no relative motion between first orbiting axis 49 and first hollow gear 37. Thus, as first hollow gear 37 is carried by differential casing 36 and revolves about central axis 45, first wheel shaft 32 also revolves about central axis 45 at the same rotational speed. In an analogous manner, second hollow gear 38 is carried by differential casing 36 and revolves about central axis 45 causing second wheel shaft 33 also to revolve about central axis 45 at the same rotational speed. When the vehicle is traveling straight ahead, differential gear system 30 divides the engine's power equally between first wheel shaft 32 and second wheel shaft 33.

When the vehicle is traveling in a curve, however, differential gear system 30 allows power to be conveyed unevenly to first wheel shaft 32 and second wheel shaft 33 such that the two wheel shafts rotate at different rotational speeds. When the vehicle is traveling in a left curve, for example, differential gear system 30 allows first wheel shaft 32 to rotate faster than second wheel shaft 33 such that the vehicle's right rear wheel on the outside of the curve can travel a greater distance than the left rear wheel on the inside of the curve.

In one example of a step 67, a portion of the drive torque is transferred to second wheel shaft 33. In the example where the vehicle is traveling in a left curve, the portion is none of the drive torque. As the vehicle begins to turn left, the pavement retards the left rear wheel and causes left rear wheel to begin to turn more slowly than the right rear wheel. This causes second wheel shaft 33 to turn more slowly, and second stably-oriented orbiting inner gear 35 begins to orbit with respect to second hollow gear 38. As inner teeth 52 of second hollow gear 38 begin to exert a counter force on outer teeth 54 of second stably-oriented orbiting inner gear 35, however, second stably-oriented orbiting inner gear 35 does not continue to orbit and maintain a stable orientation. Rather, the counter force causes support member 42 and its associated dual-axis couplings to begin to rotate about central axis 45 relative to second stably-oriented orbiting inner gear 35. When second dual-axis coupling 40 and second passive dual-axis coupling 44 rotate on support member 42 about central axis 45, second stably-oriented orbiting inner gear 35 rotates off-center about central axis 45 at a rotational speed commensurate with the path of the left rear wheel. Thus, the wheel on the inside of the curve coasts.

In a step 68, the remainder of the drive torque is conveyed from drive shaft 31 to first wheel shaft 32. In this example where the vehicle is traveling in a left curve, the remainder of the drive torque is the entire drive torque. The right rear wheel and first wheel shaft 32 continue to rotate at the same rotational speed as first hollow gear 37 and differential casing 36. First dual-axis coupling 39, first passive dual-axis coupling 43 and an additional passive dual-axis coupling (not visible from the perspective of FIG. 2A) do not overcome their binding forces and therefore do not rotate and do not allow first passive dual-axis coupling 43 to orbit with respect to first hollow gear 37.

In certain driving conditions, transferring the entire drive torque to the wheel that does not slip is an advantage not possessed by conventional differential gear systems with two bevel gears and two beveled pinions. For example, where only one wheel looses traction on ice or mud, that wheel does not spin with differential gear system 30. Instead, the entire drive torque is transferred to the wheel that has maintained traction. Conveying the entire drive torque to the wheel that has maintained traction in a curve can be more desirable than locking a conventional differential gear in a curve so that a slipping wheel does not spin. When the slipping wheel in a locked conventional differential gear again regains tractions in a curve, it is rotating either too fast (inner wheel) or too slow (outer wheel). Differential gear system 30 quickly transfers torque away both from wheels with traction on the inside of a curve and from slipping wheels.

When the vehicle straightens out after traveling in a curve, the wheel that had been coasting on the inside of the curve again rotates at the same speed as the other wheel. Thus, first wheel shaft 32 and second wheel shaft 33 again rotate at the same speed. The binding forces of second dual-axis coupling 40 and second passive dual-axis coupling 44 are no longer overcome, and support member 42 and its associated dual-axis couplings stop rotating about central axis 45 relative to second stably-oriented orbiting inner gear 35. Torque is again conveyed evenly to both first wheel shaft 32 and second wheel shaft 33.

Figure 6A:
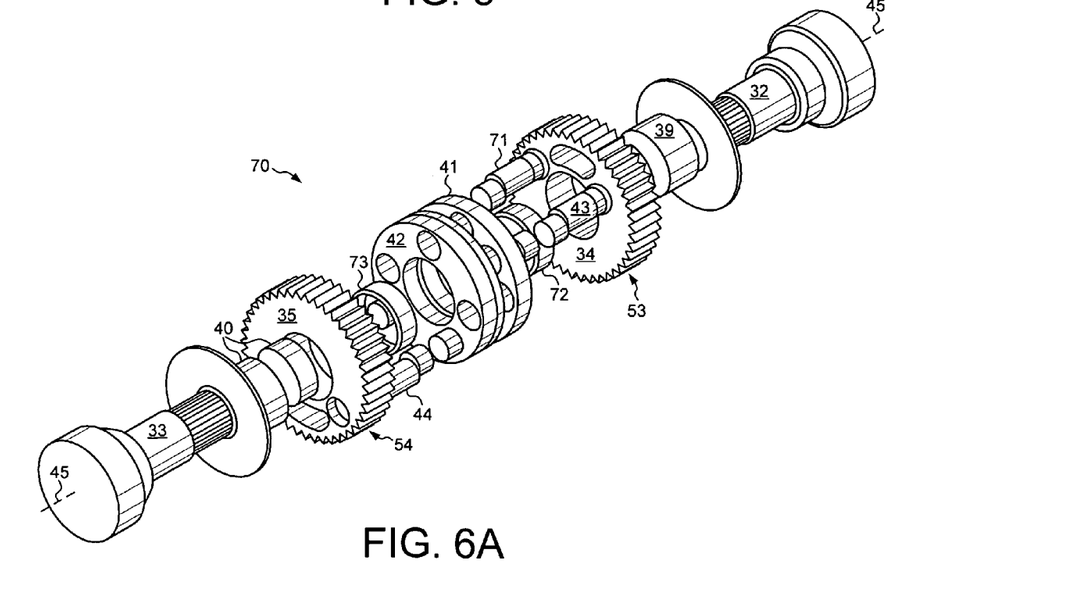
FIG. 6A is an exploded, perspective view of another embodiment of a differential gear system employing stably-oriented orbiting gears.

FIG. 6A shows an exploded, perspective view of another embodiment of a differential gear system 70 employing stably-oriented orbiting gears. Several components of differential gear system 70 function analogously to similar components of differential gear system 30 of FIGS. 2–4. Thus like components are labeled with like numerals. In differential gear system 70, support members 41–42 are located between first stably-oriented orbiting inner gear 34 and second stably-oriented orbiting inner gear 35, as opposed to on the outsides of the stably-oriented orbiting inner gears. FIG. 6A also shows an additional passive dual-axis coupling 71 in addition to first passive dual-axis coupling 43. A housing 72 for needle bearings fits into support member 41 and enables support member 41 to rotate about central axis 45. A similar housing 73 for needle bearings fits into support member 42.

Figure 6B:
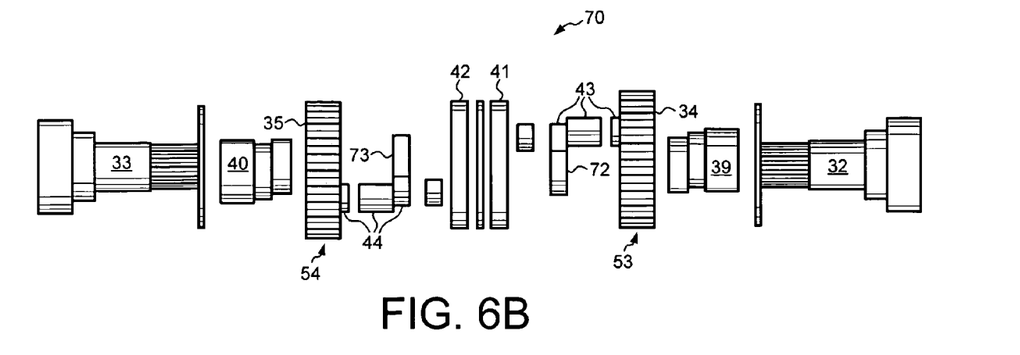
FIG. 6B is a side view of the differential gear system of FIG. 6A.

FIG. 6B is an exploded, side view of differential gear system 70 of FIG. 6A.

Figures 7A, 7B:
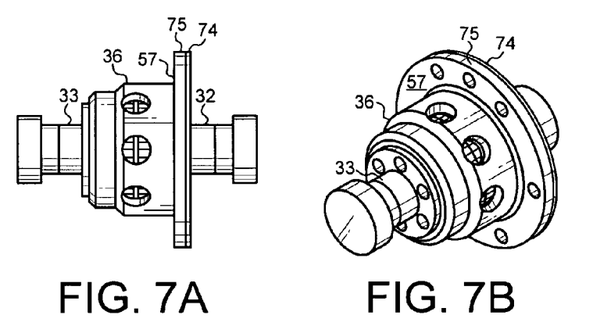
FIG. 7A is a side view of a differential casing of the differential gear system of FIG. 6A.
FIG. 7B is a perspective view of the differential casing of FIG. 7A as viewed from one wheel shaft.
Figure 7C:
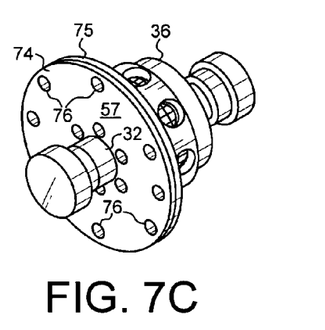
FIG. 7C is a perspective view of the differential casing of FIG. 7A as viewed from the other wheel shaft.

FIG. 7A is a side view of differential casing 36 in the embodiment shown in FIGS. 6A and 6B. First stably-oriented orbiting inner gear 34, second stably-oriented orbiting inner gear 35, support members 41–42, first passive dual-axis coupling 43, additional passive dual-axis coupling 71, second passive dual-axis coupling 44, yet another passive-axis coupling in addition to coupling 71, and needle-bearing housings 72–73 all fit within differential casing 36. Differential casing 36 has holes that allow outer teeth 53 of first stably-oriented orbiting inner gear 34 and outer teeth 54 of second stably-oriented orbiting inner gear 35 to be seen from the outside of differential casing 36. The holes reduce the weight of differential casing 36 and aid in the assembly of differential gear system 70. Flange 57 of differential casing 36 is formed by a lid 74 that fits into a base 75 in this embodiment. FIG. 7B shows a perspective view of differential casing 36 from the side of second wheel shaft 33. FIG. 7C shows a perspective view of differential casing 36 from the side of first wheel shaft 32. A crown wheel (not shown) can be attached to flange 57 by bolts that fit through holes 76.

Figures 8, 9A:
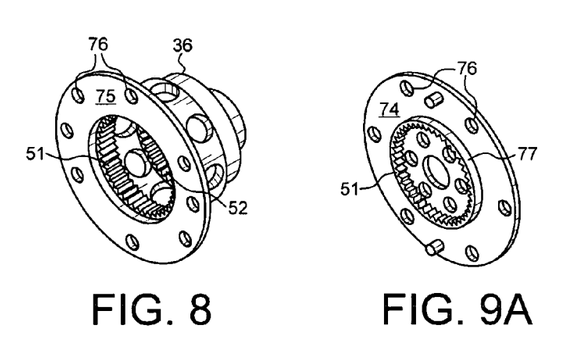
FIG. 8 is a perspective view of the differential casing of FIG. 7A showing inner teeth.
FIGS. 9A and 9B are more detailed perspective views of a lid of the differential casing of FIG. 7A.

FIG. 8 is a perspective view of differential casing 36 of differential gear system 70 without lid 74. In this embodiment, first hollow gear 37 and second hollow gear 38 are formed as an integral part of differential casing 36. Inner teeth 51 of first hollow gear 37 and inner teeth 52 of second hollow gear 38 are combined and are both located on the inside surface of differential casing 36.

Figure 9B:
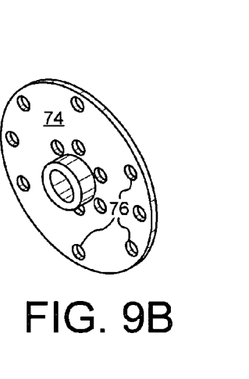

FIGS. 9A and 9B are more detailed perspective views of lid 74 of differential casing 36. Lid 74 fits into base 75 from the side shown in FIG. 9A. A continuation of inner teeth 51 of first hollow gear 37 is formed in a guide 77 on lid 74 that fits into a hole in base 75. FIG. 9B shows lid 74 from the outer side.

Figure 10A:
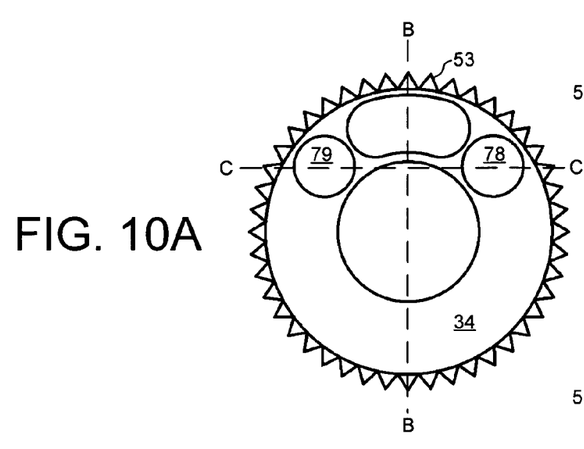
FIGS. 10A–C are cross-sectional views of a stably-oriented orbiting inner gear of the differential gear system of FIG. 6A.
Figure 10B:
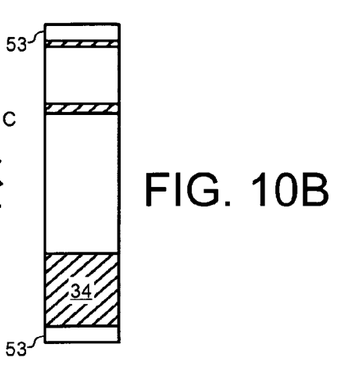
Figure 10C:
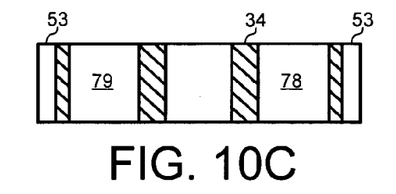

FIG. 10A is a cross-sectional view of first stably-oriented orbiting inner gear 34 of differential gear system 70. In this embodiment, first stably-oriented orbiting inner gear 34 has forty-four outer teeth 53. First stably-oriented orbiting inner gear 34 is supported, in part, by first passive dual-axis coupling 43 and additional passive dual-axis coupling 71, which fit into holes 78 and 79, respectively. FIG. 10B is a cross-sectional view of first stably-oriented orbiting inner gear 34 of FIG. 10A through cross section B—B. FIG. 10C is a cross-sectional view of first stably-oriented orbiting inner gear 34 through cross section C—C.

Figure 11A:
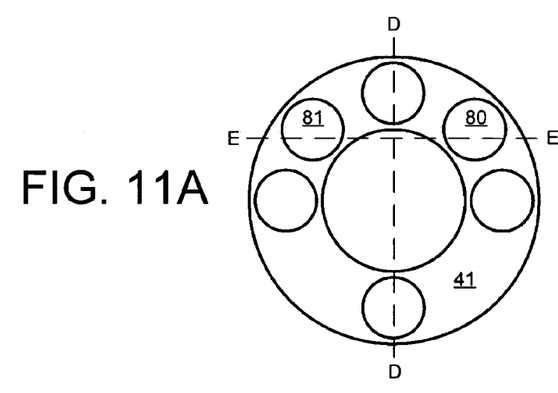
FIGS. 11A–C are cross-sectional views of a support member of the differential gear system of FIG. 6A.
Figure 11B:
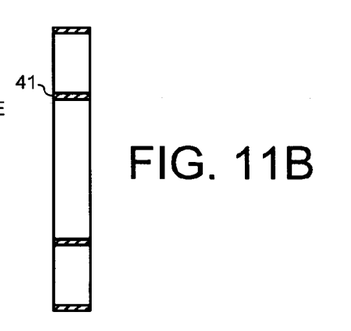
Figure 11C:
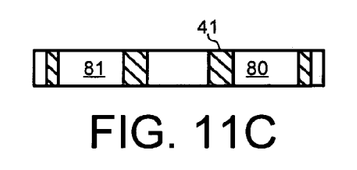

FIG. 11A is a cross-sectional view of support member 41 of differential gear system 70. In this embodiment, first passive dual-axis coupling 43 and additional passive dual-axis coupling 71 are rotatably mounted in holes 80 and 81 of support member 41, respectively. FIG. 11B is a cross-sectional view of support member 41 of FIG. 11A through cross section D—D. FIG. 11C is a cross-sectional view of support member 41 through cross section E—E.

Figure 12A:
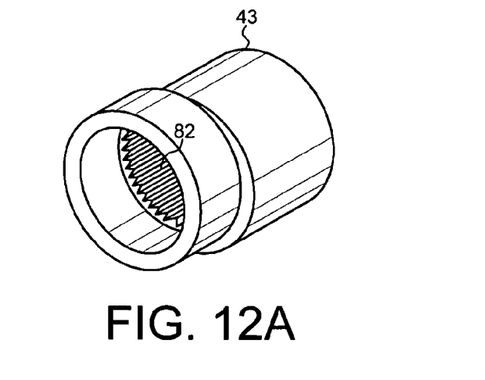
FIG. 12A is a perspective view of a passive dual-axis coupling of the differential gear system of FIG. 6A.
Figure 12B:
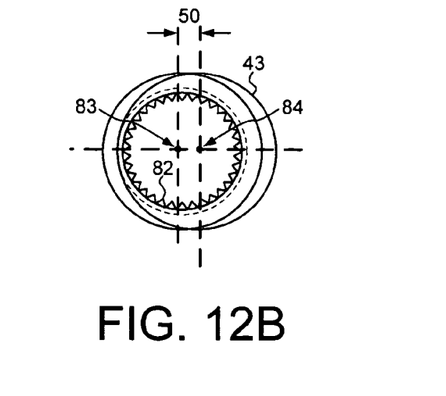
FIG. 12B is a cross-sectional front view of the passive dual-axis coupling of FIG. 12A.
Figure 12C:
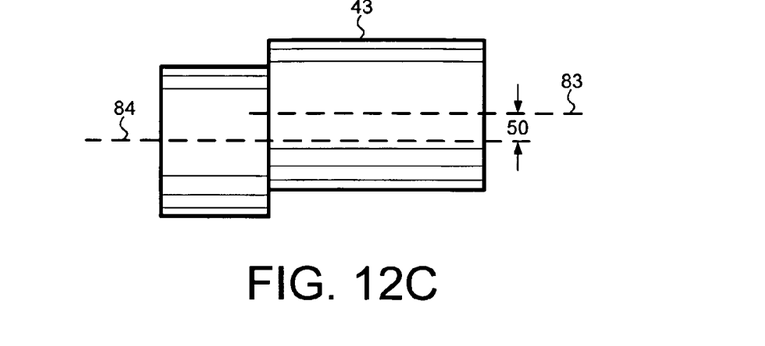
FIG. 12C is a cross-sectional side view of the passive dual-axis coupling of FIG. 12A.

FIG. 12A is a perspective view of part of first passive dual-axis coupling 43 of differential gear system 70. This part of first passive dual-axis coupling 43 has a splined interior surface 82 that mates with a complementary splined exterior surface of a remaining part of first passive dual-axis coupling 43 that is rotatably mounted in first stably-oriented orbiting inner gear 34. FIG. 12B is a cross-sectional view of first passive dual-axis coupling 43 and illustrates that first passive dual-axis coupling 43 is an eccentric crank with two parallel axes 83 and 84. The two parallel axes are separated by offset distance 50. In this embodiment, first stably-oriented orbiting inner gear 34 is supported in part by first passive dual-axis coupling 43 such that axis 83 remains stable with respect to gear 34 and orbits about axis 84. FIG. 12C is a side view of first passive dual-axis coupling 43 showing axis 83, axis 84 and offset distance 50.

Figure 13A:
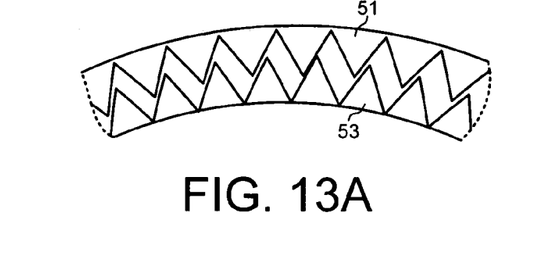
FIG. 13A is a cross-sectional view showing the substantially planar tooth surfaces of the inner teeth of a hollow gear and of the outer teeth of a stably-oriented orbiting inner gear.
Figure 13B:
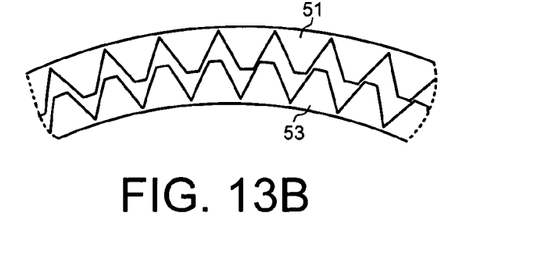
FIG. 13B is a cross-sectional view of the inner teeth of a hollow gear and the outer teeth of a stably-oriented orbiting inner gear, wherein the tops of the teeth have been truncated.
Figure 13C:
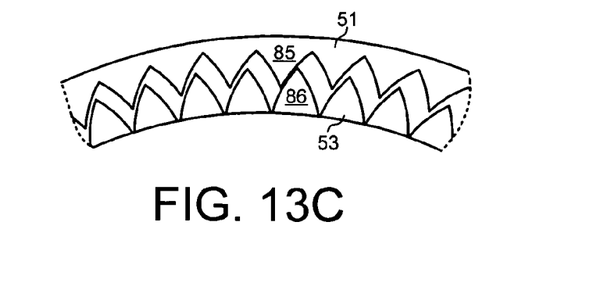
FIG. 13C is a cross-sectional view showing concave tooth surfaces of the inner teeth of a hollow gear and convex surfaces of the outer teeth of a stably-oriented orbiting inner gear in another embodiment.

FIG. 13A illustrates the substantially planar tooth surfaces of inner teeth 51 of first hollow gear 37 and of outer teeth 53 of first stably-oriented orbiting inner gear 34 of both the embodiment of differential gear system 30 and the embodiment of differential gear system 70. FIG. 13B shows another embodiment of inner teeth 51 and outer teeth 53 in which the tops of the teeth have been truncated.

In yet another embodiment shown in FIG. 13B, inner teeth 51 of first hollow gear 37 have concave surfaces, and outer teeth 53 of first stably-oriented orbiting inner gear 34 have convex surfaces. As shown in FIG. 13B, where the concave surface of an inner tooth 85 matches the convex surface of an outer tooth 86, force is transferred between the two tooth surfaces at multiple lines of engagement along the mating tooth profiles. Thus, more force can be transferred via the larger contact area of mating profiles than via a single line of engagement where two convex tooth profiles contact. In yet another embodiment, inner teeth 51 of first hollow gear 37 have convex surfaces, and outer teeth 53 of first stably-oriented orbiting inner gear 34 have concave surfaces. Force is also transferred between these tooth surfaces at multiple lines of engagement.

Although the present invention has been described in connection with certain specific embodiments for instructional purposes, the present invention is not limited thereto. Although the differential gear system is described in operation with a rear-wheel drive vehicle, the differential gear system can also be used in a front-wheel drive vehicle or an all-wheel drive vehicle. Embodiments of differential gear systems are described above with one stably-oriented orbiting inner gear per wheel shaft. In another embodiment of a differential gear system, only one stably-oriented orbiting inner gear is used to transfer power from a drive shaft to two wheel shafts. Although a stably-oriented orbiting inner gear that orbits within a hollow gear is described in relation to a differential gear system, a stably-oriented inner gear that orbits in a circular sliding motion sees application generally as a reduction gear.

In some embodiments, the inner teeth are integrally formed on an inside annular surface of the differential casing such that the hollow gear is a part of the casing. Although particular teeth geometries are described above, both the inner teeth of the hollow gear, as well as the outer teeth of the stably-oriented orbiting inner gear, can have other geometries. Individual teeth need not terminate in a sharp tip, but rather the individual teeth may have blunted tips. In some aspects, the casing forms a sealed repository that contains a viscous lubricant such as oil that lubricates the engaging surfaces of the inner teeth and outer teeth. In other aspect, no viscous lubricant is provided and the inner and outer teeth engage one another without any intervening lubricant.

Although a stably-oriented orbiting inner gear and a hollow gear are described as having teeth, a differential gear system, a reduction gear system and an expansion gear system in accordance with the invention can operate without teeth. In one embodiment, a stably-oriented orbiting inner disk orbits within a toothless cylinder. Torque is conveyed from the inner surface of the toothless cylinder to the outer toothless surface of the stably-oriented orbiting inner disk by friction between the two toothless surfaces. Although a stably-oriented orbiting gear is described within a rotating hollow gear, a reduction gear system or an expansion gear system can also be configured as a stably-oriented orbiting hollow outer gear that orbits about a rotating inner gear. Accordingly, various modifications, adaptations, and combinations of various features of the described embodiments can be practiced without departing from the scope of the invention as set forth in the claims.

What is claimed is:

1. A differential gear system, comprising:
    a casing;
    a hollow gear with inner teeth rotatably mounted in said casing to rotate about a central axis;
    a wheel shaft rotatably mounted in said casing to rotate about said central axis;
    a dual-axis coupling having a first axis parallel to a second axis, said dual-axis coupling attached to said wheel shaft such that said first axis is aligned with said central axis;
    a stably-oriented orbiting inner gear with outer teeth, said outer teeth in meshing engagement with said inner teeth of said hollow gear, said dual-axis coupling rotatably mounted in said stably-oriented orbiting inner gear such that said stably-oriented orbiting inner gear rotates about said second axis of said dual-axis coupling, wherein said stably-oriented orbiting inner gear is supported by said dual-axis coupling to orbit about said central axis, and wherein said casing is rotatably mounted to rotate about said central axis; and
    a passive dual-axis coupling having a gear axis parallel to a support axis, said passive dual-axis coupling rotatably mounted in said stably-oriented orbiting inner gear to rotate about said gear axis, wherein said stably-oriented orbiting inner gear is supported by said passive dual-axis coupling.

2. A differential gear system, comprising:
    a casing;
    a hollow gear with inner teeth rotatably mounted in said casing to rotate about a central axis;
    a wheel shaft rotatably mounted in said casing to rotate about said central axis;
    a dual-axis coupling having a first axis parallel to a second axis, said dual-axis coupling attached to said wheel shaft such that said first axis is aligned with said central axis;
    a stably-oriented orbiting inner gear with outer teeth, said outer teeth in meshing engagement with said inner teeth of said hollow gear, said dual-axis coupling rotatably mounted in said stably-oriented orbiting inner gear such that said stably-oriented orbiting inner gear rotates about said second axis of said dual-axis coupling, wherein said stably-oriented orbiting inner gear is supported by said dual-axis coupling to orbit about said central axis, and wherein said casing is rotatably mounted to rotate about said central axis; and
    a second hollow gear with inner teeth rotatably mounted in said casing to rotate about said central axis;

a second wheel shaft rotatably mounted in said casing to rotate about said central axis;

a second dual-axis coupling having a third axis parallel to a fourth axis, said second dual-axis coupling attached to said second wheel shaft such that said third axis is aligned with said central axis; and a second stably-oriented orbiting inner gear with second outer teeth, said second outer teeth in meshing engagement with said inner teeth of said second hollow gear, said second dual-axis coupling rotatably mounted in said second stably-oriented orbiting inner gear such that said second stably-oriented orbiting inner gear rotates about said fourth axis of said second dual-axis coupling, wherein said second stably-oriented orbiting inner gear orbits about said central axis.

3. The differential gear system of claim 2, wherein said hollow gear and said second hollow gear are attached to one another.

4. A differential gear system, comprising:

a casing;

a hollow gear with inner teeth and outer teeth, wherein said inner teeth are rotatably mounted in said casing to rotate about a central axis;

a wheel shaft rotatably mounted in said casing to rotate about said central axis;

a dual-axis coupling having a first axis parallel to a second axis, said dual-axis coupling attached to said wheel shaft such that said first axis is aligned with said central axis;

a stably-oriented orbiting inner gear with outer teeth, said outer teeth in meshing engagement with said inner teeth of said hollow gear, said dual-axis coupling rotatably mounted in said stably-oriented orbiting inner gear such that said stably-oriented orbiting inner gear rotates about said second axis of said dual-axis coupling, wherein said stably-oriented orbiting inner gear is supported by said dual-axis coupling to orbit about said central axis, and wherein said casing is rotatably mounted to rotate about said central axis; and an outer stably-oriented orbiting hollow gear with inner teeth, wherein said outer teeth of said hollow gear are in meshing engagement with said inner teeth of said outer stably-oriented orbiting hollow gear.

5. The differential gear system of claim 4, further comprising:

an outer dual-axis coupling, wherein said outer stably-oriented orbiting hollow gear is supported by said outer dual-axis coupling.

* * * * *